United States Patent [19]
Lindbloom

[11] Patent Number: 5,740,076
[45] Date of Patent: Apr. 14, 1998

[54] SYSTEM FOR DESCRIBING A COLOR GAMUT IN A GRAPHICAL DATA PROCESSING SYSTEM

[75] Inventor: Bruce J. Lindbloom, Eden Prairie, Minn.

[73] Assignee: Candela, Ltd., Burnsville, Minn.

[21] Appl. No.: 565,065

[22] Filed: Nov. 30, 1995

[51] Int. Cl.$^6$ .............................. G03F 3/00; G06F 17/00
[52] U.S. Cl. ........................ 364/514 R; 364/514 A; 364/525; 364/526; 382/167; 395/109; 395/131
[58] Field of Search ............................ 358/500, 504, 358/501, 515, 518, 523, 524, 525; 395/109, 131; 382/167; 364/526, 514 A

[56] References Cited

U.S. PATENT DOCUMENTS

| | | | |
|---|---|---|---|
| H1506 | 12/1995 | Beretta | 345/199 |
| 4,819,193 | 4/1989 | Imao | 364/526 |
| 4,884,221 | 11/1989 | Sugiyama et al. | 364/526 |
| 4,901,254 | 2/1990 | Dolezalek et al. | 364/526 |
| 5,023,815 | 6/1991 | Wilson et al. | 364/526 |
| 5,218,555 | 6/1993 | Komai et al. | 364/526 |
| 5,319,473 | 6/1994 | Harrington | 358/501 |
| 5,487,020 | 1/1996 | Long | 364/571.01 |
| 5,493,518 | 2/1996 | Keating | 364/578 |
| 5,563,724 | 10/1996 | Boll et al. | 358/502 |
| 5,588,093 | 12/1996 | Harrington | 395/109 |
| 5,611,030 | 3/1997 | Stokes | 395/131 |
| 5,619,434 | 4/1997 | Keating | 364/578 |

FOREIGN PATENT DOCUMENTS

| | | | |
|---|---|---|---|
| 0313796 | 10/1987 | European Pat. Off. | G06F 3/023 |
| 0403081 | 6/1990 | European Pat. Off. | G09G 1/28 |
| 0448250A1 | 3/1991 | European Pat. Off. | H04N 1/46 |
| 0592146A2 | 10/1992 | European Pat. Off. | H04N 1/46 |

OTHER PUBLICATIONS

Derefeldt, Gunilla and Hedin, Carl-Eric, "Pallete—A color aid for VDU images", Perceiving, Measuring, and Using Color, Proceedings of SPIE, Santa Clara, California, vol. 1250, pp. 165–176, Feb. 15, 1990.

Robertson, Philip K., "Perceptual Color Spaces—Visualizing Color Gamuts: A User Interface for the Effective Use of Perceptual Color Spaces in Data Displays", IEEE Computer Graphics & Applications, pp. 50–64, Sep. 1988.

*Primary Examiner*—Emanuel T. Voeltz
*Assistant Examiner*—Cuong H. Nguyen
*Attorney, Agent, or Firm*—Schwegman, Lundberg, Woessner & Kluth, P.A.

[57] ABSTRACT

An improved method is described for obtaining, processing and displaying information relating to the ability of a display system to render any candidate color. This method is comprised of a Gamut Signal Encoder which produces a signal that is separately processed by a Distance Encoder, a Distance Classifier and Color Encoder and a Gamut Test Encoder, thus providing three processed signals for assisting in the understanding of a display device's ability to render the color.

15 Claims, 7 Drawing Sheets

1

SYSTEM FOR DESCRIBING A COLOR GAMUT IN A GRAPHICAL DATA PROCESSING SYSTEM

FIELD OF THE INVENTION

This invention pertains generally to the field of reproduction of colors in computer systems, and particularly to the accurate rendition of colors in output or display devices where the output or display device is capable of only a limited range of colors. The invention is particularly useful in the field of computerized pre-press, publishing, and computerized production of video or film segments.

BACKGROUND OF THE PRIOR ART

An important part of color reproduction is the rendering of colors onto display devices. The colors may be spot colors, such as tints, or they may be digitized color photographs, such as produced by color scanners. Display devices, such as monitors and printers, are capable of showing only a subset of all perceivable colors. This subset of colors is called the device color gamut.

Colors subjected to a reproduction system may or may not fall within the gamut of the target display device. In cases where the colors fall outside of the gamut, they cannot be exactly reproduced. If no corrective action were taken, reproduction of graphics having out of gamut colors would result in undesirable distortions of the tonal and color range of the graphic. In such cases, some action is required, either notifying the user to modify the colors to fit within the gamut, or employing an algorithm to automatically compress the colors according to some predetermined strategy to fit within the gamut. In either case, a reliable technique is needed to determine whether or not a color lies inside a device gamut. When considering applications involving high resolution digitized images containing millions of colors, this gamut test must be very fast.

A typical instance is where high-quality color photographs have been scanned into a computer system and are being readied in a page layout program for eventual reproduction in printed magazines. The inks and print technology to be used most likely cannot reproduce the full color gamut of the original photograph. It is essential when fitting the color expression of the photograph into the limited range of print reproduction that this be done in a way that is consistent with the original intent or color aesthetics of the original. In other words, the compression of the color space of the final image must be done in a way that preserves as much as possible, the color expression and aesthetic appearance of the original.

Software used in such systems generally tests each candidate output color against the gamut of the output device, and if an out-of-gamut situation is encountered, either interrupts processing to inform the operator, or uses some type of substitution algorithm to replace the candidate color with one that is in the output device gamut.

Current practice in the prior art tests colors by using a three-dimensional look up table (LUT). Each dimension, or axis of this LUT represents a channel of a tristimulus color. For example, a color represented by the triplet XYZ consists of three channels X, Y and Z. Each axis of the LUT is sampled at discrete values in each channel. The LUT cell addressed by a set of channel samples contains information indicating whether or not that sample color lies inside the gamut. When a color is to be tested using this LUT, the sample intervals along each axis are found which contain the value of each color channel. Candidate testing colors whose channel values are such that they are not exactly represented by the samples in the table are estimated by some means. A common estimation means employs some interpolation scheme based on the relative location of the color channel within the bounding sample interval.

The prior art technique in current practice uses the LUT cells to contain Boolean information (i.e. inside or outside) to indicate the state of the color addressing the cell. FIG. 1A shows a block diagram of such a prior art system. This prior art technique is subject to two major flaws. First, there is no information available to indicate how far out of gamut the color is. For colors which are just barely out of gamut, a user may choose to not bother with the minor adjustment needed to bring them into the gamut. However, if the color is very far out of gamut, it will require his attention. The Boolean LUT result cannot distinguish between these cases.

The second, and more serious flaw is that since the actual function representing the result of a color test is discontinuous at the gamut boundary (a Boolean inside or outside), a LUT containing samples of this function may give incorrect results in the interval containing the actual gamut surface. We call this region the region of uncertainty. The uncertainty results from the use of a continuous reconstruction function (e.g. tri-linear interpolation) to obtain an estimate of a discontinuous, sampled function. Because of this, prior art systems are subject to large, unknown and essentially random errors in identifying which colors are in or out of gamut, for all the colors near the gamut boundary of the device.

The net result of these shortcomings in the prior art is that color output produced by such systems may have noticeable color errors, where inaccurate color estimates and substitutions have been made for out of gamut colors. Colors which are out of gamut may not be recognized as such, and colors which are in gamut may be erroneously identified as being out. This results in the need for rework of a production job, and considerable operator intervention, and often, successive trial and error attempts, to obtain output that is acceptable for the intended use.

SUMMARY OF THE INVENTION

To overcome these and other problems in the prior art, the present invention provides an improved system and method of analyzing candidate colors in a data processing system, and for quickly and accurately determining which colors are outside the gamut of the target display or printing device. Unlike prior art methods, the method of this invention produces accurate identification of colors and is not subject to the large, random type errors discussed above.

According to one aspect of the invention, a gamut signal representing a color to be processed is analyzed by a gamut signal encoder, based on a three dimensional look-up table populated with samples of a continuous function rather than a discontinuous function. The function chosen is an encoded distance between the sample color and the nearest point on the gamut surface. This signal is then converted by a distance encoder into the actual distance the color is from the gamut surface, and a gamut test encoder to provide the correct inside or outside Boolean signal. A distance classifier and color encoder provides a classified and color coded signal which is useful for rapidly recognizing the magnitude of color distances. The samples may be reconstructed with continuous reconstruction functions (e.g. tri-linear interpolation), to produce a quite accurate distance estimate.

This permits rapid and accurate evaluation of out of gamut colors correct to within a very small tolerance (no region of uncertainty), and an indication of how close a color is to the gamut boundary, either outside or inside. This information is useful where it is also necessary to shift or compress colors inside the gamut as part of a correction for modifying colors which are outside the gamut, in order to preserve the nature and appearance of the original.

These and other features and advantages of the invention will become apparent from the following description of the preferred embodiment of the invention.

DESCRIPTION OF THE PREFERRED EMBODIMENT

Figure 2:
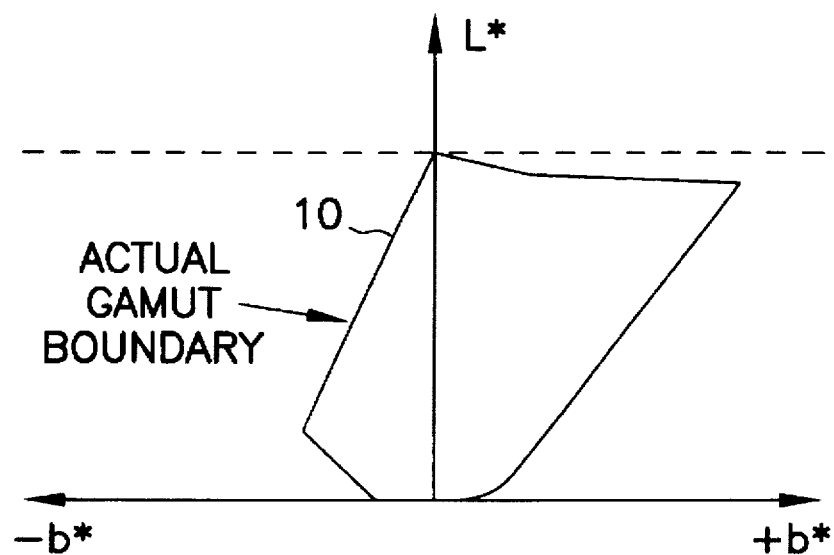
FIG. 2 shows a cross section of the gamut of a typical printer; specifically, a two-dimensional section of the three-dimensional gamut color-space profile of the printer.

A review of the problems existing with the prior art color gamut testing o technique will be presented before describing the present invention in detail. FIG. 2 shows a cross section of the gamut of a typical printer. The gamut of a printer is defined to be the set of all colors that the printer can render as its controlling color channels are varied through all possible combinations. The surface of the gamut is defined to be the subset of gamut colors that lie on the extremities of the gamut, that is, those colors having immediate neighbors that are not part of the gamut. The distance of a color from the gamut surface, used to create the continuous look up table (LUT), is defined to be the minimum of the set of distances between the color and every color on the gamut surface.

The slice shown in FIG. 2 is at the plane a*=0. Although the gamut in this figure is shown in the Commision Internationale d'Éclairage (CIE) L*a*b* color space, it may be shown in any tristimulus color space. For example, the commonly used systems of RGB, XYZ, YIQ (television), or YCC (photo CD), or any other tristimulus color space could also be used with this invention. Each printer type is profiled to create a gamut LUT for the particular printer according to a discontinuous, sampled approximation of the boundary 10. Colors falling within the boundary 10 can be reproduced by the target printer, while those falling outside the boundary 10 cannot. The typical application in the prior art tests colors in the image being processed for gamut, then optionally presents, on the computer monitor, an overlay in a warning color, for example purple, those zones of color which are out of gamut. The operator then selects an automatic process which attempts to bring the out-of-gamut colors in gamut, or uses a manual tool via the mouse or other pointing device to reduce saturation in the marked areas to correct the image.

Figure 3:
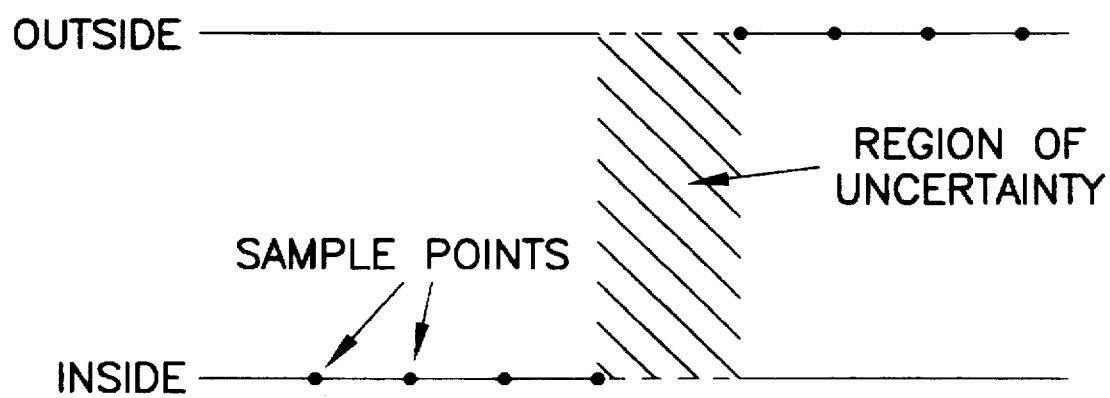
FIG. 3 shows, in one dimension for clarity, the region of uncertainty for a prior art color gamut discontinuous function.

A problem with this is that the prior art techniques simply are not accurate enough. They miss some out of gamut areas, and erroneously mark some which are actually in gamut. Also, for the ones marked out of gamut, there is no quantitative information on how far out it is. FIG. 3 illustrates, in a single dimension, the region of uncertainty created by the sampled discontinuous function for the gamut boundary of the prior art. A number of sample points are shown along the axis. The actual gamut lies somewhere between the inside and outside boundaries, in the region of uncertainty. Interpolation for values between points creates an unknown or uncertain result, because there is no basis for deciding whether to quantify an intermediate value as in or out.

Figure 4:
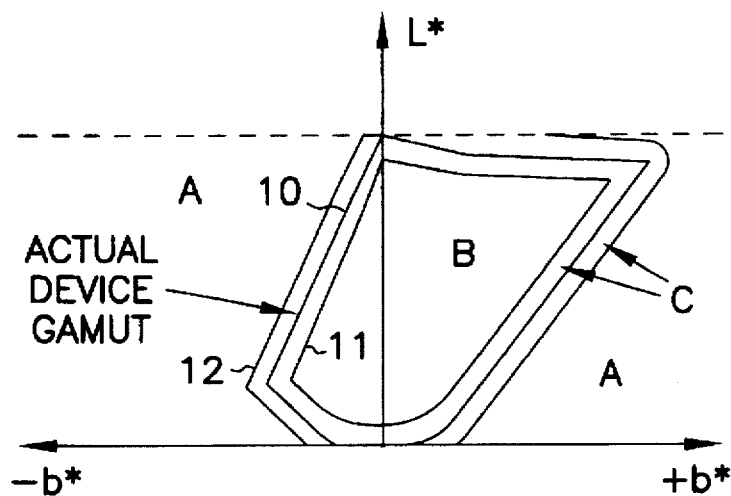
FIG. 4 shows, in two dimensions, the region of uncertainty for a prior art color gamut discontinuous function.

The result of this effect in two dimensions is shown in FIG. 4. The actual device gamut boundary is indicated by shape 10. Shapes 11 and 12 are the inner and outer limits of the region of uncertainty. The width of the region of uncertainty, W, may be calculated from the distances between sample points along the three LUT axes. For example, if the CIE L*a*b* color space is used and the sample intervals along each of the L*, a* and b* axes are spaced dL, da and db units apart, the width, of the region of uncertainty would be:

$$W = \pm 0.5 \times (dL^2 + da^2 + db^2)^{1/2}$$

The region of uncertainty divides color space into three regions:

A) This region is defined to be all colors that are outside the gamut by more than W units.

B) This region is defined to be all colors that are inside the gamut by more than W units.

C) This region is defined to be all remaining colors, namely those that are within ±W units of the gamut surface.

These regions are shown in FIG. 4. Gamut tests with colors in region A will always produce the correct out of gamut result. Gamut tests with colors in region B will always produce the correct in gamut result. Gamut tests with colors in region C (the region of uncertainty) may produce incorrect results. This means that a color that is actually inside the gamut by up to W units may be incorrectly reported to be outside the gamut. Similarly, a color that is up to W units outside the gamut may be incorrectly reported to be inside the gamut.

However, since there is no way of determining which of the three regions A, B or C the color belongs to, the result of a gamut test with any color cannot be known for certain to be correct. This is a serious flaw. Of course, one way to reduce these errors in prior art systems would be to provide closer density sampling in the LUT. However, this is impractical because of the large memory requirements and slow program performance it would bring.

Figure 1A:
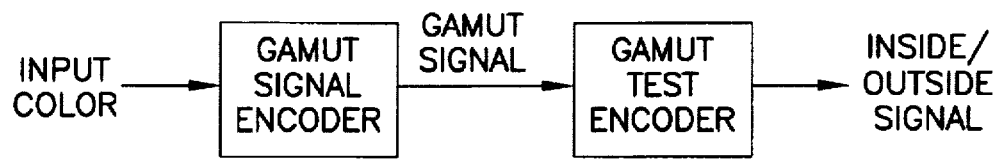
FIG. 1A shows a block diagram of a prior art method of checking colors for gamut.
Figure 1B:
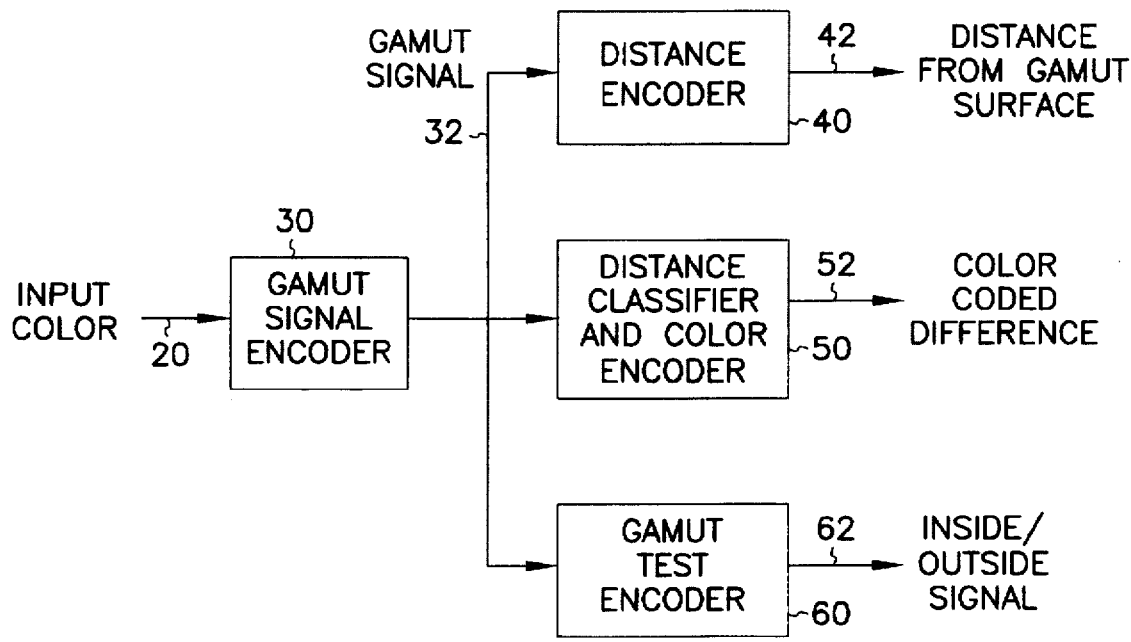
Fig. 1B shows a block diagram of a method of checking colors for gamut, according to the present invention.

Figure 1B shows a block diagram of the new system. A color 20 to be tested is converted to a Gamut Signal 32 by the Gamut Signal Encoder 30. This signal is then converted by the Distance Encoder 40 into a signal 42 representing the actual distance the color is from the gamut surface. The Gamut Signal 32 is also processed by the Gamut Test Encoder 60 to provide the correct inside or outside Boolean signal 62. The Gamut Signal 32 is processed by the Distance Classifier and Color Encoder 50 to provide a classified and color coded signal 52 which is useful for rapidly recognizing the magnitude of color distances.

Figure 9:
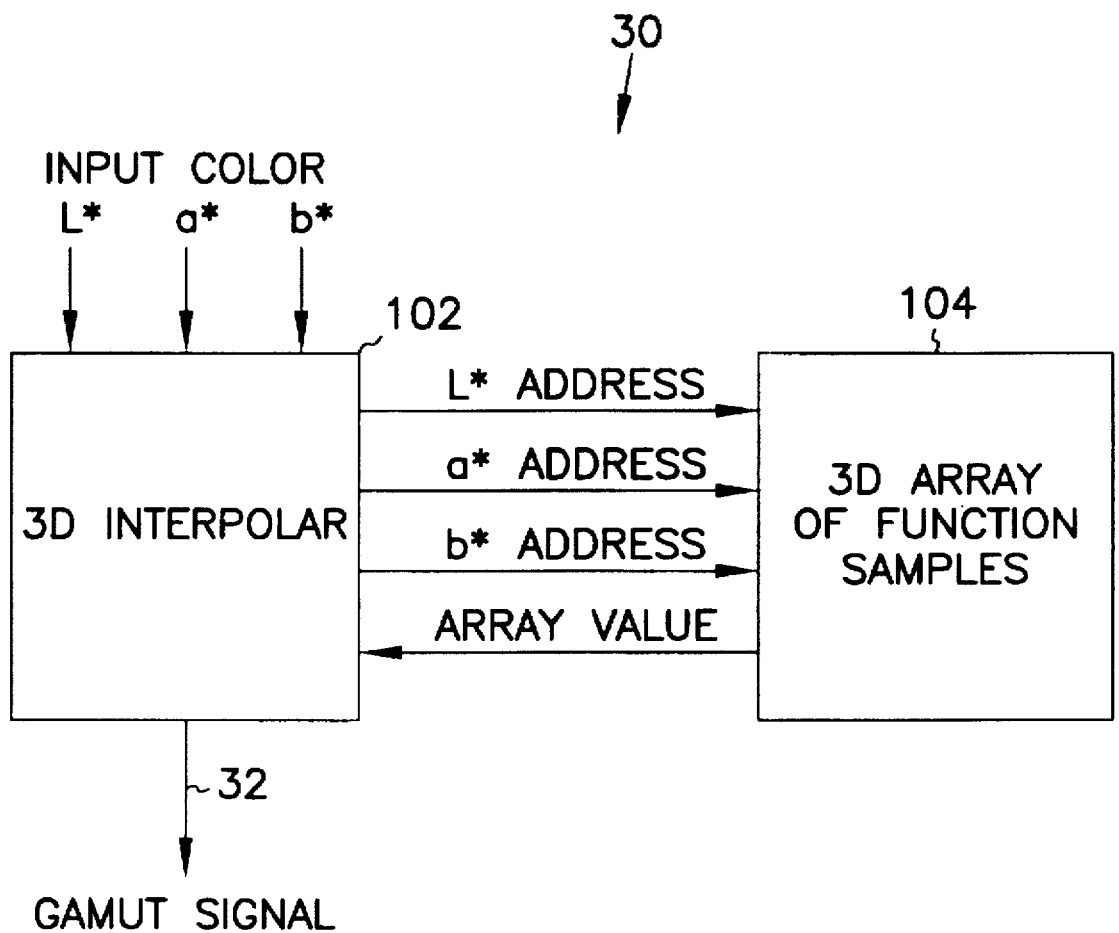
FIG. 9 shows a block diagram of one embodiment of a Gamut Signal Encoder according to the present invention.

The Gamut Signal Encoder 30 is a three dimensional LUT with a three dimensional interpolator. FIG. 9 is a block diagram of one embodiment of a Gamut Signal Encoder 30 showing a 3D Interpolator 102 which processes the input color signals 20 into address signals and interpolation signals. The address signals are used to locate multiple samples in a 3D array 104 from which the 3D interpolator 102 generates the gamut signal 32 using the interpolation signals. The Output Gamut Signal 32 to the Distance Encoder 40, Distance Classifier and Color Encoder 50 and Gamut Test Encoder 60, as shown in Figure 1B.

Figure 5:
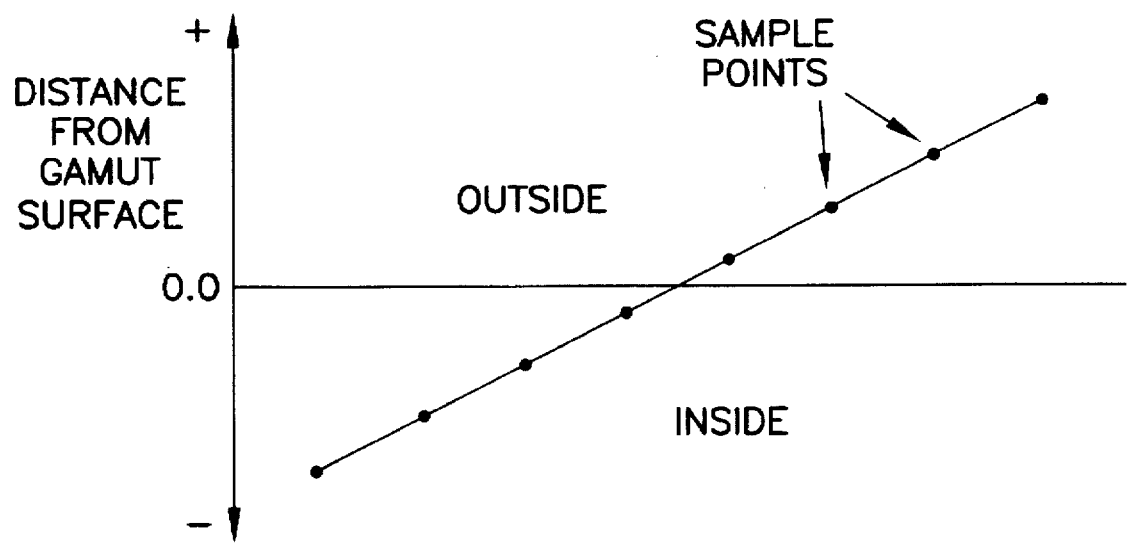
FIG. 5 shows, in one dimension for clarity, the improvement in gamut boundary determinations obtained by the present invention through the use of a continuous function.

Specifically, Gamut Signal Encoder 30 is populated with samples of a continuous function rather than a discontinuous function. A continuous function is one that has no breaks or tears. The heavy black line in FIG. 3 instantaneously jumps to the top as it continues toward the right. At the exact point where this transitions occurs, the line is broken into two lines. This is discontinuous. By contrast, the line in FIG. 5 is continuous because it has no breaks. The function chosen is an encoded distance between the sample color and the nearest point on the gamut surface. Distances for colors outside the gamut are positive. Distances for colors inside the gamut are negative. The distance for a color on the gamut surface is zero. When the LUT samples are reconstructed with continuous reconstruction functions (e.g. tri-linear interpolation), a quite accurate distance estimate is obtained. FIG. 5 shows the improvement obtained from the use of a continuous function. Compare this with FIG. 3.

Various methods of distance encoding for the LUT samples may be used, depending on system requirements or constraints. For example, if a LUT cell contains an 8 bit byte, the encoded distance must be represented by an integer value in the range of 0 to 255. For the CIE L*a*b* color space, color differences or distances are defined by the CIE 1976(L*a*b*) color difference formula, which is:

$$\Delta E=[(\Delta L^*)^2+(\Delta a^*)^2+(\Delta b^*)^2]^{1/2}$$

If we use the CIE L*a*b* color space, the L* axis is bounded by 0 and 100. Therefore, the largest distance an in-gamut color could possibly be from the gamut surface is 50ΔE. A suggested encoding of distance, in ΔE, units, for a single byte LUT cell is:

LUT Value=Minimum (2×(Distance+50), 255)

Rounding should be used when quantizing from a real number (Distance) to an integer (LUT Value). The Gamut Signal Encoder interpolates the LUT Values, producing the Gamut Signal.

The Distance Encoder converts the Gamut Signal into an actual distance. Using the encoding scheme in the example just cited, the Distance Encoder would perform the following operation:

Distance=0.5×(Gamut Signal Value)−50

This encoding can represent distances in 0.5 ΔE increments for all colors up to 77.5 ΔE out of gamut. Placing the maximum possible Gamut Signal Value for a byte, for example, 255 in one embodiment, into the above equation provides the maximum possible distance that may be encoded with the above encoding equations. The general form would depend on the equation used when encoding distances into LUT values. The equation for LUT Value above is an example.

The Gamut Test Encoder 60 produces a Boolean inside or outside signal 62 from the Gamut Signal. Again using the encoding scheme in the previous example, the Gamut Test Encoder 60 would perform the following operation:

Color is inside if Gamut Signal≦100

Color is outside if Gamut Signal>100

The general form would depend on the equation used when encoding distances into LUT values. The equation for LUT Value above is an example. The value of 100, above, was obtained by placing the distance of a color on the gamut surface (i.e. 0.0) into the LUT Value equation above: Minimum (2×(0.0+50)=100, 255)=100.

The Distance Signal 42 is used to display, in numeric form, the distance of any particular color (such as one pointed to on the screen with the cursor) from the gamut boundary. This gives precise, accurate information about specific colors, whereas the Color Coded Difference 52 gives general, global, less specific information about many colors at once.

The Inside/Outside Signal 62 is used to control whether the Color Coded Difference 52 is to be shown for a pixel or the Input Color 20. For colors that are inside the gamut (as determined by the Inside/Outside Signal), the original color is shown. For colors that are outside the gamut, the Color Coded Difference is shown instead, as an overlay. In this way, the colors of an image look normal if they are in gamut, and are colored with an overlay if they are not. The overlay color gives a general indication of how far out the colors are.

The Distance Classifier and Color Encoder 50 produces a color 52 representing the distance classification of the color with respect to the device gamut. Specifically, it classifies the Gamut Signal 32 to determine which range it falls within, then outputs the color assigned to that range. The classification properties may be set by a user using a control similar to that shown in the example of FIG. 6.

Figure 6:
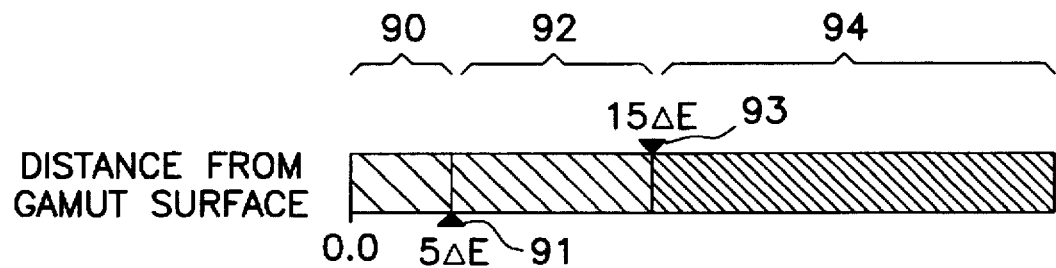
FIG. 6 represents user controls according to the invention for the distance classification of the color with respect to the device gamut.

In FIG. 6 the number of classification regions may be selected and then the boundaries between adjacent regions may be set by dragging on the small triangular controls. The colors used for each classification may be specified by using an interactive color picker (present on most computers today). These settings could be specified by the user to meet his specific requirements.

The specific example in FIG. 6 shows three classifications, which is the presently preferred embodiment of the invention. However, it will be appreciated that other numbers of classifications, at least two or greater, may be used in accordance with the invention. In the example of FIG. 6, the first region 90 represents those colors that are between 0 and 5 ΔE units outside the device gamut. The second region 92 shows those colors between 5 and 15 ΔE, units outside. The third region 94 is used for all colors greater than 15 ΔE, units out of gamut. Ideally, these region limits may be user selectable through the user interface, by dragging and repositioning marker characters 91, 93. The application, for example a photo rendering program, or a page layout program, may assign different warning color overlays for the regions. For region 90, which is only slightly out, a yellow overlay could be used, in this example. For region 92, which is significantly out, an orange overlay could be used, in this example. For example, region 94, which is very far out, a red overlay could be used, in this example. In this way quantitative information is provided to the operator for making more accurate and useful decisions. The warning colors used o may also be user-selectable.

The Inside/Outside Signal produced by the Gamut Test Encoder may be used as a switch to display either the Input Color for those colors that are in-gamut or the Color Coded Distance for those colors that are out of gamut.

Figure 10:
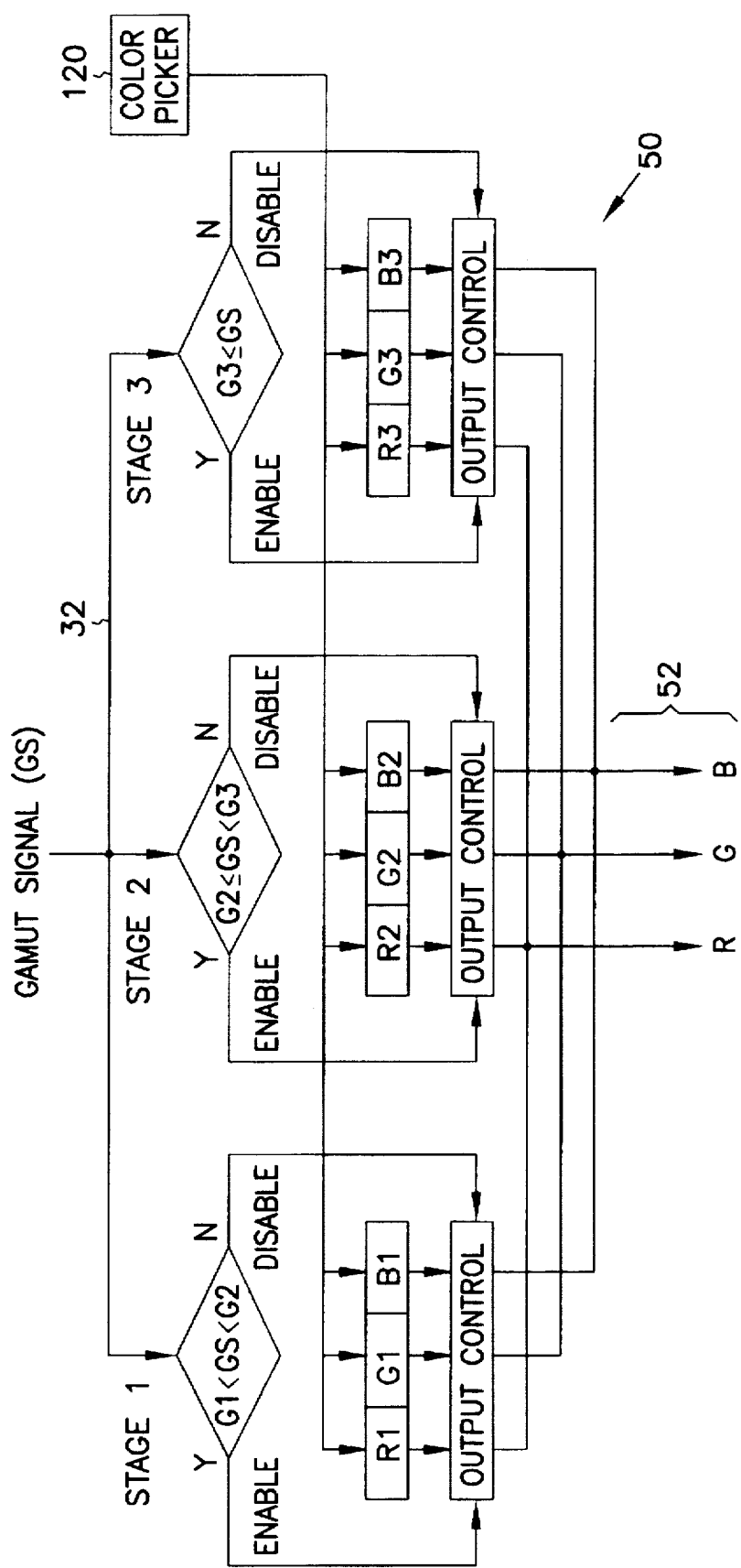
FIG. 10 shows a block diagram of one embodiment of a Distance Classifier and Color Encoder according to the present invention.

One embodiment of a Distance Classifier and Color Encoder 50 is shown in FIG. 10. In this embodiment, the Distance Classifier and Color Encoder 50 is configured to provide outputs according to the three color classifications shown in FIG. 6 and described above. Therefore, stage 1 corresponds to colors falling in region 90, stage 2 corresponds to colors falling in region 92, and stage 3 corresponds to colors falling in region 94. G1 represents the value of the Gamut Signal 32 at a distance of 0.0 from the gamut surface. G2 and G3 are the values of the Gamut Signal 32 corresponding to distances indicated by controls 91 and 93 of FIG. 6. The overlay colors R1G1B1, R2G2B2, and R3G3B3 are user selected via a Color Picker 120 to assist the operator in determining how far a color is out of gamut, as described above.

In this embodiment the use of three regions was provided to illustrate one system according to the present invention. Other embodiments of the Distance Classifier and Color Encoder 50 provide different numbers of color classifications without departing from the scope and spirit of the present invention, and the present example of three colors is not limiting or exclusive.

Figure 7:
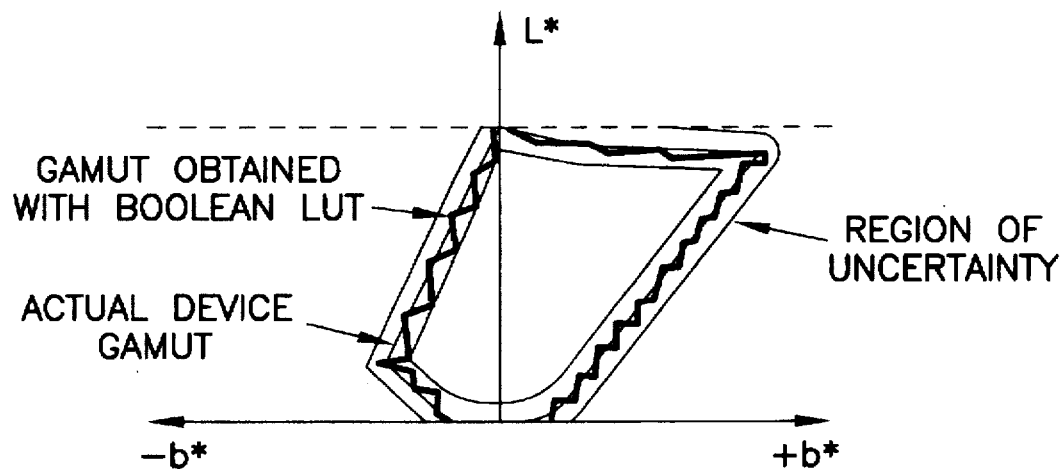
FIG. 7 shows the gamut boundary obtained from the prior art Boolean LUT method, illustrating the region of uncertainty.
Figure 8:
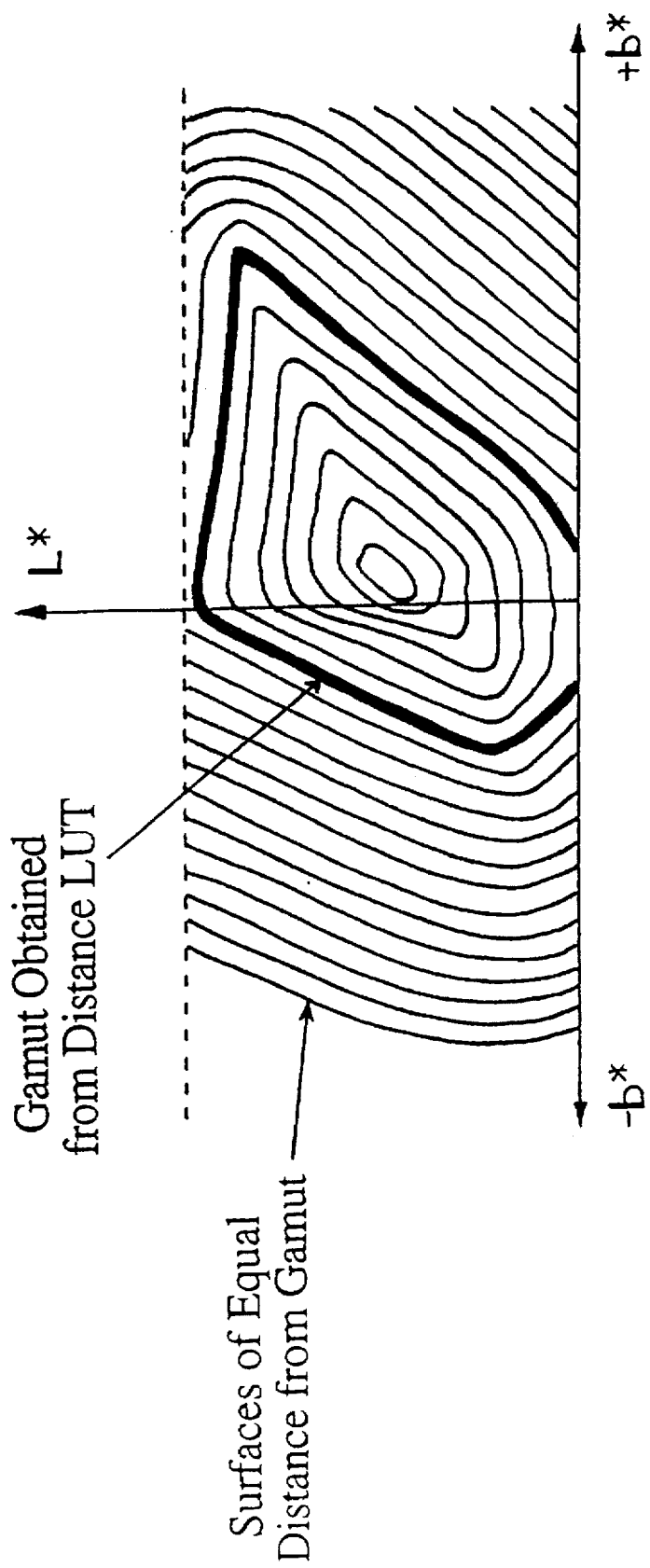
FIG. 8 shows the gamut boundary surface and distance in or out of gamut information obtained from the continuous function technique of the present invention.

A comparison of FIGS. 7 and 8 shows the improvement obtained with the present invention over the prior art. FIG. 7 shows the gamut boundary obtained from the Boolean LUT method, in current practice today. As a result of the interpolation and thresholding of a discontinuous function, this gamut is a poor estimate of the actual gamut. The underlying LUT lattice becomes visible as a "staircase" effect. This uneven gamut estimate lies within the region of uncertainty. The incorrect results are also evident within this region.

Compare FIG. 7 with the new method shown in FIG. 8. Both of these figures were produced with the exact same sample points. It is evident from FIG. 8 that the new method produces a much better estimate of the gamut surface. It not only models the actual gamut more accurately, the estimate is also much smoother. In addition, FIG. 8 shows the distance information obtained from the improved method. Surfaces of constant distance are known for all distances. These surfaces layer on the outside (and inside) of the gamut, much like the layers of an onion. When sliced as shown in FIG. 8 (along the a*=0 plane), the surfaces appear as dark lines, in this example spaced 6 ΔE units apart.

If the locations of the sample points along the axes of the three dimensional LUT may be arbitrarily selected, they should contain the samples of the device gamut representing the pure primary and secondary colors (red, yellow, green, cyan, blue and magenta) as well as white and black, since these colors represent pointed cusps in the device gamut which may be rounded if not included in the sample set. It will be seen from the above that the present invention provides an improved and a more accurate method of testing colors for output device gamut, and for providing quantitative information as to actual distance in or out of gamut.

What is claimed is:

1. A system for characterizing a color gamut, comprising:
   a gamut signal encoder, receiving an input color signal and producing a gamut signal;
   a distance encoder, receiving the gamut signal and producing a distance signal;
   a distance classifier and color encoder, receiving the gamut signal and producing a color coded difference signal; and
   a gamut test encoder, receiving the gamut signal and producing an inside/outside signal.

2. The system of claim 1 wherein the gamut signal encoder comprises a three dimensional look up table for three dimensional interpolation.

3. The system of claim 2 wherein the three dimensional look up table contains samples from a continuous function.

4. The system of claim 2 wherein the gamut signal encoder converts the input color signal having a L* component, an a* component, and a b* component into an L* address, an a* address, and a b* address respectively which are converted into the gamut signal using the three dimensional look up table.

5. The system of claim 1 wherein the distance classifier and color encoder comprises at least two output stages corresponding to at least two distinct color regions designated by at least two output colors.

6. The system of claim 5 wherein the distance classifier and color encoder comprises a color picker for selecting the at least two output colors.

7. A user control for characterizing a color gamut, comprising:
   a gamut signal encoder, receiving an input color signal and producing a gamut signal;
   a distance classifier and color encoder, receiving the gamut signal and producing a color coded difference signal;
   a user interface receiving the color coded difference signal and providing a graphical depiction of deviation of the input color signal from the color gamut, the user interface producing at least two output colors overlaid on out-of-gamut colors to indicate relative departure of the color input signal from the color gamut.

8. The user control of claim 7 wherein the gamut signal encoder comprises a three dimensional look up table for three dimensional interpolation.

9. The user control of claim 8 wherein the three dimensional look up table contains samples from a continuous function.

10. The user control of claim 8 wherein the gamut signal encoder converts the input color signal having a L* component, an a* component, and a b* component into an L* address, an a* address, and a b* address respectively which are converted into the gamut signal using the three dimensional look up table.

11. The user control of claim 8 wherein the distance classifier and color encoder comprises a color picker for selecting the at least two output colors.

12. The user control of claim 7 wherein the distance classifier and color encoder comprises at least two output stages corresponding to at least two distinct color regions designated by at least two output colors.

13. The user control of claim 11 wherein the at least two distinct color regions may be programmed by a user.

14. A method for characterization of an input color signal according to a color gamut comprising the steps of:
   selecting the color gamut;
   converting the input color signal into a gamut signal using three dimensional color interpolation in a continuous function;
   generating a color coded difference signal by comparing the gamut signal to the color gamut;
   displaying at least two different output signals corresponding to the deviation of the gamut signal to the color gamut.

15. The method of claim 14 wherein deviation of the gamut signal is measured in ranges of ΔE units outside the device gamut.

* * * * *